UNITED STATES PATENT OFFICE.

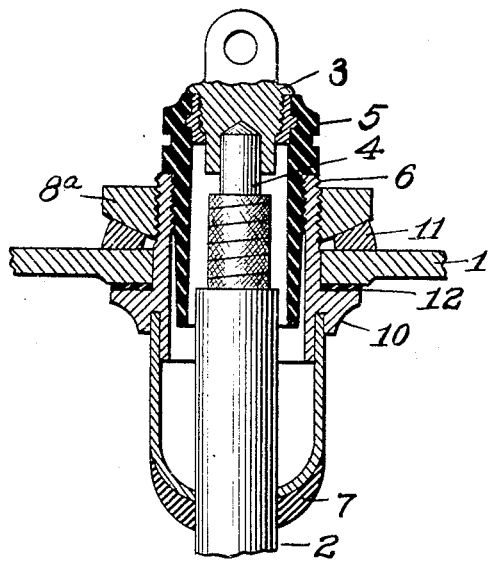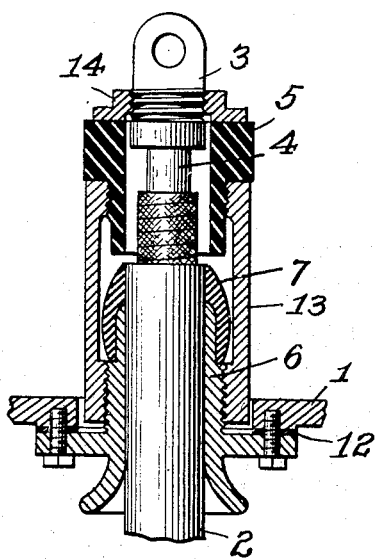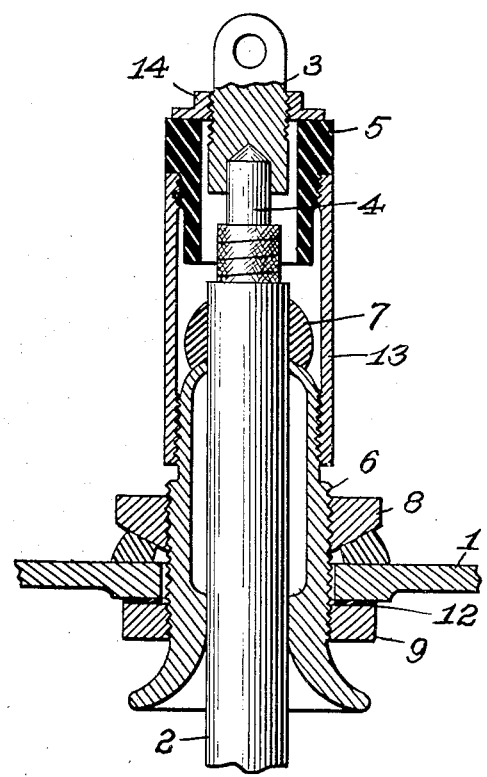

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

TERMINAL FOR CABLES ENTERING JUNCTION-BOXES.

1,130,483.      Specification of Letters Patent.      Patented Mar. 2, 1915.

Application filed March 19, 1913. Serial No. 755,480.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Terminals for Cables Entering Junction-Boxes, of which improvements the following is a specification.

This application is, as to all subject-matter common to the two, a division of my application which has resulted in the granting of Patent No. 1,061,527.

My invention relates to terminals for cables entering junction-boxes, and the object thereof is to provide a structurally and electrically efficient terminal for the purpose described.

A more specific object of my invention is to provide means for connecting such terminals to junction-box walls, whereby the usual machining of the metal casing adjacent to the inlet opening may be eliminated.

A still further object of my invention is to provide means for protecting the lead sheath of a cable from rupture when secured to a junction box by the usual wiped soldered joint.

In the accompanying drawing, which forms part of my specification, I have illustrated in longitudinal sectional views three embodiments of my invention, such views being marked Figs. 1, 2 and 3.

Like numerals are used to designate like parts in the several figures.

Junction-boxes of the character contemplated by my invention are casings (usually made for the most part of cast iron) in which a plurality of electrical conductor cables are led through suitable orifices, and the conductors of such cables interconnected for various purposes. In such electrical installations it is desirable to attach a terminal structure to the end of the cable, such structures usually consisting of a lead-out adapted to be electrically connected to a cable conductor, an insulator adapted to protect the bared end of the conductor, and a thimble surrounding the cable.

Referring more particularly to the drawings, the junction box 1 is represented by a small section of an orificed wall thereof. A single conductor lead-sheathed cable 2 extends through each orifice and is provided with a terminal structure which in turn is secured to the junction-box wall. In each instance the terminal structure consists of a lead-out 3 electrically connected to the conductor core 4, an annular insulator 5 surrounding the bared end of the conductor and engaging said lead-out, and a thimble 6 secured to the sheath of said cable 2 by means of a wiped soldered joint 7, such thimble also being secured to the box wall 1 and to the insulator 5. It is desirable in such a junction box that the terminals be secured to the junction box in a manner to exclude moisture from the interior of the box.

As stated above, junction boxes are, for the most part, made of cast iron. Consequently the surfaces of the box wall, adjacent to an orifice therethrough, is apt to be of varying thickness or to be otherwise irregular. In order to secure an even water-tight bearing of the members which clamp the terminal to the box, both the inner and outer surfaces of the wall adjacent to the orifice may be machined until the wall is brought to an even or constant thickness. This however is an expensive procedure, and, to the end that the desired end obtained by such machining may be accomplished in a cheaper manner, I interpose a spherically surfaced washer between the box wall and a correspondingly surfaced clamping nut. In Fig. 1 one of the clamping shoulders of the thimble 6 is formed integrally with such thimble and is designated by the numeral 10. As shown in this figure, a spherically surfaced washer 11 is placed between the inner wall surface and the nut 8ª which also has a spherical surface coöperating with the surface of said nut. It will be seen that said washer 11, which is of smaller internal diameter than said nut 8ª, will form with said nut a ball-and-socket joint effecting an even bearing of the terminal clamping members upon the box wall. The arrangement in Fig. 3 with the exception that both clamping members are nuts affording a means for adjusting the terminal structure. In each instance it is desirable to interpose a suitable gasket 12 between the clamping surfaces on the exterior of the box as shown.

Another feature of my invention concerns the protection of the lead sheath of such cables against rupture at the point of its connection to a junction box by a wiped soldered joint. It is frequently desirable to make such a joint between the cable sheath and a rigid surrounding member, such as the box wall, or a supplementary rigid member having in turn a rigid connection to the junction box, the joint being made in such a position that it will be subjected to stress when the cable is bent. If a cable be thus firmly held at one point by such a joint, the bending of the cable to any considerable extent will, unless means of prevention are employed, result in breaking the sheath at the point where such joint holds the cable inflexible, and on the convex side of the bend. The rupture of the cable at this particular point I believe to be due to the rigidity of the body of solder and its strong adhesion to the lead sheath. In such installations therefore the wiped soldered joint becomes a point of weakness. In order to prevent such a breaking of the cable sheath when connected to a junction box in the manner described, I provide an abutment for the cable exteriorly of the soldered joint and effective to resist the bending strain of the cable. This feature of my invention is illustrated in Figs. 2 and 3, wherein the cable sheath is connected indirectly to the junction-box wall by being connected first by means of a wiped joint to the inner end of the rigid thimble 6, through the sleeve of which the cable passes. It will be seen that the sleeve of the thimble 6 forms an abutment effective to resist all the strain of the cable due to a manipulation thereof, and that the point of weakness at the soldered joint, heretofore present in such structures, is fully protected. As will be seen, the outer end of the thimble is rounded or bell-shaped to prevent a cutting of the cable sheath.

The thimbles shown in Figs. 2 and 3 are formed of two parts, one of which is a sleeve 13 adapted to engage at its opposite ends the lower thimble portion and the insulator 5, and further adapted to surround soldered joint 7. Such a specific construction of the thimbles facilitates the installation of such terminals, as will be readily understood when consideration is given to the steps involved in making the installation.

In each of the forms of terminals, shown herein, the arrangement of the several parts is such that the terminal as a whole may be assembled on the end of a cable and the terminal-provided cable secured to the box wall after such assembling has been effected. In making an installation of the terminal illustrated in Fig. 3, the lead sheath and insulation of the cable is first suitably cut back, after which the lead-out 3 may be sweated upon the cable core 4, and the thimble portion 6 threaded upon the cable and secured thereto by a wiped soldered joint 7. The sleeve 13 may then be screwed upon the thimble portion 4 and the insulator 5 screwed within the sleeve. Insulating compound may then be poured into the space within the terminal, and a nut 14 screwed upon the lead-out 3 to close the compound-filled space and to hold the lead-out rigidly in position.

I claim as my invention:

1. The combination of a junction-box having an orifice in a wall thereof, an electrical-conductor cable entering said box through said orifice, a terminal structure secured to said cable and having as a part thereof a metal thimble, means for clamping said terminal-provided cable to said box, said means including a nut having a spherical bearing surface, and a washer between said nut and said box wall having a spherical bearing surface corresponding with and adjacent to said nut bearing surface.

2. A thimble adapted to be bolted in an orifice in the wall of a junction-box and to surround and engage a cable entering such box, said thimble being provided with a shoulder adapted to bear upon a surface of a junction-box wall, and a washer adapted when the parts are assembled to lie interposed between said shoulder and the surface of the junction-box wall against which it bears, the contacting surfaces of the washer and the shoulder which engages it forming a ball-and-socket joint.

3. In a terminal structure for electrical conductor cables, the combination of a thimble adapted to be secured to a cable, a lead-out adapted to be secured to a conductor of such cable, an annular insulator, and a sleeve engaging said thimble and insulator.

4. A terminal structure adapted to be introduced in an orifice in the wall of a junction box, said terminal structure including a thimble adapted to surround a cable, to be secured thereto, and to be secured to a junction box wall, an annular insulator adapted to surround the end of the cable, a lead-out adapted to be connected electrically with the cable core and to engage said insulator, and a sleeve engaging at its opposite ends said thimble and insulator.

5. The combination of a junction-box having an orifice in a wall thereof, a lead-sheathed cable entering said box through said orifice, means including a wiped soldered joint for holding said cable rigidly to the wall of said junction-box, and means for preventing a rupture of the sheath of said cable at the point of said joint, said means consisting of a bearing surface exteriorly of said joint and affording strain-sustaining contact with proximate portions of the surface of said cable when said cable is flexed.

6. In a junction-box installation, the combination of a lead-sheathed electrical cable, a junction box, a sleeve-like body through which said cable is threaded and to which the sheath thereof is joined by a wiped soldered joint, said sleeve-like body having rigid connection to said junction box and affording a strain-sustaining bearing surface for said cable exterior of said joint when said cable is flexed.

In testimony whereof I have hereunto set my hand.

CHARLES W. DAVIS.

Witnesses:
JAMES P. DAVIS,
THOS. B. HARVEY.